(No Model.) 2 Sheets—Sheet 1.

A. KISSELL.
AUTOMATIC PULVERIZING HARROW.

No. 604,352. Patented May 17, 1898.

Witnesses
Lee J. Van Horn
Victor J. Evans

Inventor
Aaron Kissell,
By John Wedderburn Attorney (No Model.) 2 Sheets—Sheet 2.

A. KISSELL.
AUTOMATIC PULVERIZING HARROW.

No. 604,352. Patented May 17, 1898.

Witnesses
Lee J. Van Horn
Victor J. Evans

Inventor
Aaron Kissell,
By John Wedderburn. Attorney

UNITED STATES PATENT OFFICE.

AARON KISSELL, OF CYGNET, OHIO, ASSIGNOR OF ONE-HALF TO FRANK M. LOE AND NELSON GUYER, OF SAME PLACE.

AUTOMATIC PULVERIZING-HARROW.

SPECIFICATION forming part of Letters Patent No. 604,352, dated May 17, 1898.

Application filed May 14, 1897. Serial No. 636,482. (No model.)

*To all whom it may concern:*

Be it known that I, AARON KISSELL, of Cygnet, in the county of Wood and State of Ohio, have invented certain new and useful Improvements in Automatic Pulverizing-Harrows; and I do hereby declare the following to be a full, clear, and exact description of the invention, such as will enable others skilled in the art to which it appertains to make and use the same.

The invention relates to an automatic pulverizing-harrow.

It consists in the combination, with the harrow and the frame carried thereby, of a harrow-frame connected to said roller-frame bars permitting it to follow the ground independently of the said roller-frame and provided with a series of chopping-knives arranged side by side and connected with suitable crank-arms actuated, preferably, from the roller-shaft and connected with a transverse rod or shaft on the rear frame in such manner as to give the blades a longitudinal and vertical vibration, adapting them to chop and pulverize the ground over which the harrow passes. It further serves as a means for adjusting the throw of the harrow-blades and the depth to which they shall be allowed to penetrate the ground. It will be best understood from the following description and claims, reference being had to the accompanying drawings, in which—

Figure 1:
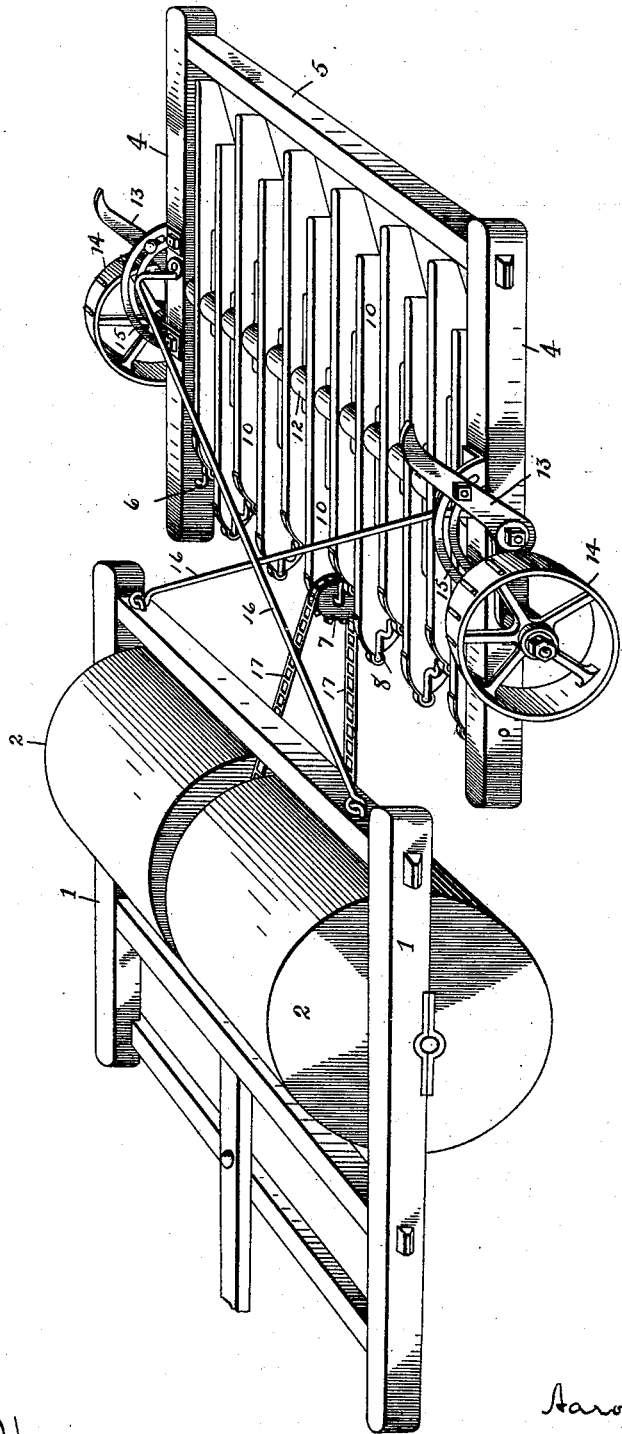
Figure 2:
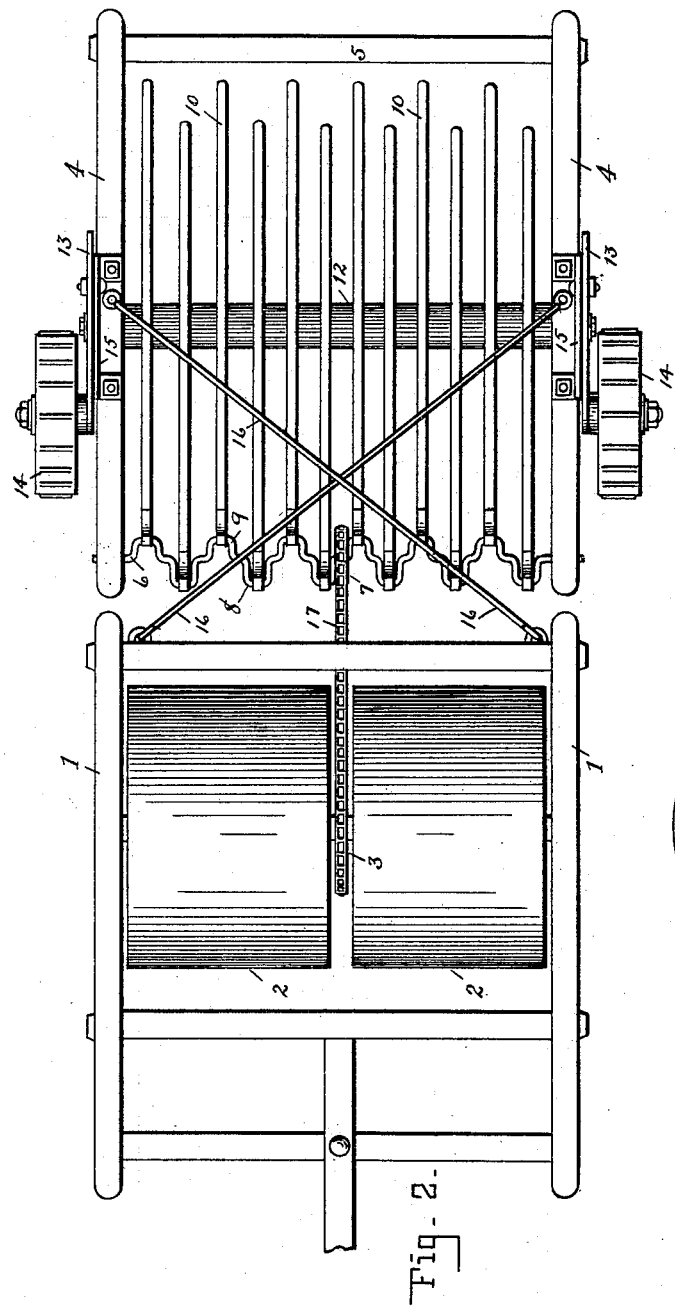
Figure 3:
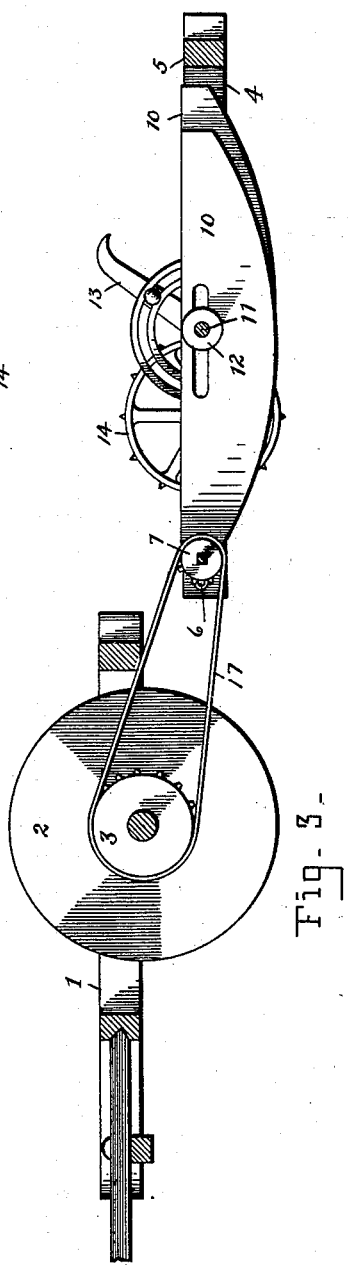

Figure 1 is a perspective view of a machine embracing the invention. Fig. 2 is a plan view of the same. Fig. 3 is a longitudinal section showing the means for actuating the chopping-knives and pulverizing-knives of the harrow.

1 indicates a strong rectangular frame in which are journaled the axles of the roller 2, said roller being divided at or near its center and provided intermediate the portions thereof with a grooved pulley or sprocket-wheel 3, for a purpose which will appear, said parts resting upon and rotating with the roller-frame axle.

4 4 indicate the side bars of the harrow-frame, and 5 the rear transverse bar thereof, the forward ends of the frame-bars being connected by a crank-shaft 6, carrying midway between its ends a sprocket-wheel 7, between which and the ends of the shaft journaled in the side frame-bars 4 the shaft 6 is provided on each side with a series of cranks 8 9, set alternately opposite each other, as shown in the plan view. To these crank-arms are pivotally connected the forward ends of a series of parallel blades or choppers 10 10, set on edge or in vertical position side by side. These blades near their upper edges and in rear of the center of their length are provided with longitudinal slots, which engage a through-rod 11, extending from the side frame-bars 4 and provided with a series of spacing sleeves or thimbles 12 12 intermediate the blades for separating and spacing them on the rod 11 and keeping them in parallel relation to each other, as shown.

The rod 11 extends beyond the frame-bars 4 and has journaled on each end a lever 13 upon a stud-shaft, on the lower end of which is mounted a carrying-wheel 14. The upper arm of this lever is held in engagement with a slotted arch 15 by means of a bolt and screw, which permit the adjustment of said arm, and with it of the roller or wheel 14, for adjusting the height of the frame 4, and with it the depth of cut of the knives 10. The harrow-frame 4 is connected with the roller-frame 1 by means of link rods or bars 16, arranged, preferably, to cross each other, as shown, thereby giving a bracing connection of the harrow-frame with the roller-frame. The sprocket-wheel 7 has a drive-chain 17 connecting it with the pulley 3 on the roller-shaft for operating it. Any suitable form of drive-chain and pulley that will serve to insure the rotation of the wheel 7, carrying the crank-shaft 6, may be employed.

By the arrangement described it will be seen that the forward ends of the chopping-blades or cutters have a rotary movement imparted to them while at or slightly in rear of the center of their length, and they connect with and slide upon a transverse rod, so that a vibratory or up-and-down movement, together with a drawing cut, is given to the blades, which serves effectually to pulverize the ground previously left in a suitable condition to be acted upon thereby by the roller passing over the ground in advance of the blades.

It will be seen that by the operation described a drawing cut is given to the knives, which is much more effective in action and acts as much less of a drag upon the team propelling the same than the harrow-teeth on harrows of the usual construction. The crank-arms of the crank-shaft 6 move from their highest point forward, downward, and rearward, thereby giving to the forward ends of the knives a sort of stepping action, which materially relieves the drag of the knives upon the ground.

Having thus described my invention, what I claim as new, and desire to secure by Letters Patent, is—

1. The combination with the roller-frame, of a harrow-frame connected to said roller-frame to permit it to follow the undulations of the ground independently thereof, a series of longitudinally-arranged blades set on edge with long cutting edges on their lower faces and connected at their forward ends with alternate oppositely-set cranks on a shaft journaled in the harrow-frame, said shaft being connected with and driven from the roller-shaft, substantially as and for the purpose described.

2. In a combined roller and harrow, the longitudinally-arranged parallel blades connected at their forward ends with alternate oppositely-set crank-arms formed on a shaft journaled in said frame, means for guiding the movements of the rear ends of said blades, and means connecting the roller-shaft with said crank-shaft for actuating the latter, substantially as described.

3. The combination with the harrow-frame, of a crank-shaft located at the forward end of said frame and having alternately oppositely disposed crank-arms, means for actuating said shaft connected therewith, a series of parallel longitudinally-arranged blades connected with said crank-arms at their forward ends having slots near their upper edges, a transverse frame-rod passing through the slots in said blades, and spacing-thimbles intermediate said blades, for the purpose and substantially as described.

4. A harrow-frame provided at its forward end with a crank-shaft having the alternate oppositely-set crank-arms, a pulley connected therewith for actuating it, parallel blades connected with the crank-arms of said shaft and having lower longitudinally-arranged cutting edges, means for guiding the movements of the rear ends of the blades, and means for regulating or adjusting the height of the frame for regulating the depth of the cut of the blades, substantially as described.

5. A roller-frame in combination with a harrow-frame connected to said harrow-frame by bracing link-rods crossing each other as described and hinged to the roller-frame for permitting the harrow to follow the ground independently of the roller-frame, chopping-blades mounted in said harrow-frame, a crank-shaft for imparting a chopping movement thereto, and a sprocket-wheel and drive-chain connecting the said crank-shaft and roller-shaft, for the purpose and substantially as described.

In testimony whereof I have signed this specification in the presence of two subscribing witnesses.

AARON KISSELL.

Witnesses:
HUGH V. McGIVERN,
H. FENBERG.